(12) United States Patent
Hoerig et al.

(10) Patent No.: US 6,272,453 B1
(45) Date of Patent: Aug. 7, 2001

(54) CONCURRENT LEGACY AND NATIVE CODE EXECUTION TECHNIQUES

(75) Inventors: Timothy R. Hoerig, Beavercreek; William J. Cannon, Centerville; David K. Remnant, Dayton; Paul D. Ward, Centerville, all of OH (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/451,156

(22) Filed: Nov. 30, 1999

Related U.S. Application Data

(63) Continuation-in-part of application No. 09/002,960, filed on Jan. 5, 1998, now Pat. No. 6,041,402.

(51) Int. Cl.[7] .................................................. G06F 9/455
(52) U.S. Cl. ........................ 703/27; 712/200; 703/27
(58) Field of Search .................... 712/200; 703/27, 703/23

(56) References Cited

U.S. PATENT DOCUMENTS

| | | | |
|---|---|---|---|
| 5,574,927 | * | 11/1996 | Scantlin ................................. 703/27 |
| 5,619,665 | * | 4/1997 | Emma .................................. 712/208 |
| 5,701,508 | * | 12/1997 | Glew .................................... 712/23 |
| 5,742,794 | * | 4/1998 | Potter ................................... 703/26 |
| 5,784,638 | * | 7/1998 | Goetz ................................... 712/43 |
| 5,956,730 | * | 9/1999 | Burroughs ........................... 707/104 |
| 6,031,992 | * | 2/2000 | Cmelik et al. .......................... 717/5 |
| 6,081,890 | * | 6/2000 | Datta ..................................... 713/1 |
| 6,105,119 | * | 8/2000 | Kerr ..................................... 711/219 |
| 6,128,731 | * | 10/2000 | Zarrin ..................................... 713/1 |

* cited by examiner

Primary Examiner—Eric Coleman
(74) Attorney, Agent, or Firm—Robert W. Keller

(57) ABSTRACT

A method and apparatus for emulating instructions of a microprocessor ("legacy instructions") with an incompatible instruction set which provides increased throughput relative to known emulation systems. In particular, each word of legacy memory is translated into an opcode/operand field and a dual function vector/tag field. The vector field represent addresses to legacy instruction emulation routines. The tag field is indexed to table of "thunk" objects, which can be used for various purposes. Such purposes include a disabling part of the legacy software, augmenting the legacy software with native software, and gathering execution statistics without modifying the legacy software.

10 Claims, 5 Drawing Sheets

CONCURRENT LEGACY AND NATIVE CODE EXECUTION TECHNIQUES

CROSS REFERENCE TO RECITED APPLICATIONS

This application is a continuation-in-part of commonly owned, patent application Ser. No. 09/002,960, now U.S. Pat. No. 6,041,402, filed on Jan. 5, 1998, and is related to commonly owned patent application Ser. No. 09/451,431, now U.S. Pat. No. 6,212,614, filed on even date, entitled; "Legacy MIL-STD-1750A Software Emulator Address Translation Using Power PC Memory Management Hardware", by Hoerig and Cannon.

BACKGROUND OF THE INVENTION

1. Field of the Invention

The present invention relates to a method and apparatus for emulating legacy instructions of a microprocessor and more particularly to a method and apparatus which enables a legacy microprocessor to be upgraded with an upgrade microprocessor with an incompatible instruction set and execute both legacy and native code.

2. Description of the Prior Art

It is known that microprocessors are configured with different instruction set architectures (ISA). The ISA determines the instruction set for a particular microprocessor. Application programs are executed by the microprocessors normally written in relatively high level language, which is compiled into machine instructions compatible with the instruction set for the specific microprocessor. Microprocessors are increasingly being designed to execute instructions faster and faster. As such, systems incorporating such microprocessors are often upgraded to increase the speed of the system. Unfortunately, depending on the particular upgrade, often times the instruction set of the upgrade microprocessor is incompatible with the instruction set of the microprocessor to be replaced ("legacy microprocessor"). As such, in such applications, the existing application programs often need to be rewritten in new and modern computer languages with modern compilers. Unfortunately, such an undertaking can be quite cumbersome and expensive.

Due to the age and obsolescence of many existing avionic onboard computers, the reliability of such computers is rapidly declining while maintenance is becoming more difficult and costly to achieve. As such, it is sometimes required to replace outdated "legacy" microprocessors with newer technology microprocessors. To work around instructions set incompatibilities, emulation systems (emulators) have been developed. Emulators are known which emulate the instructions set of the legacy microprocessor in order to enable the instructions of the legacy microprocessor to be "executed" by a different microprocessor. Both software and hardware based emulators are known. For example, various software emulators for the F-16 avionics integration support facility (AISF) common modular environment (COMET) are described in document no. F-16AISF-COMET-100 (EMULATORS-SWD-A, dated May 21, 1996). Hardware based emulators for military standard MIL-STD-1750A, are discussed in the document entitled Line Replaceable Unit Emulator Hardware Product Fabrication Specification, document no. SFF20702 dated Apr. 16, 1996.

Unfortunately, known software emulators have been known to be relatively inefficient. In particular, in such known software emulators, legacy instructions are fetched for the upgrade microprocessor which uses a look up table to interpret the legacy instruction. Since each legacy instruction must be interpreted, computer systems which incorporate cache memory are known to suffer from relatively high probability of cache misses which decreases the overall throughput of the system.

Another problem with known software emulators is the inability to optimize the native code environment. Thus there is a need to improve emulation software routines which allows for optimizing of the native code environment.

SUMMARY OF THE INVENTION

Briefly, the present invention relates to a method and apparatus for emulating instructions of a microprocessor ("legacy instructions") with an incompatible instruction set which provides increased throughput relative to known emulation systems. In particular, each word of legacy memory is translated into an opcode/operand field and a dual function vector/tag field. The vector field represent addresses to legacy instruction emulation routines. The tag field is indexed to table of "thunk" objects, which can be used for various purposes. Such purposes include a disabling part of the legacy software, augmenting the legacy software with native software, and gathering execution statistics without modifying the legacy software.

BRIEF DESCRIPTION OF THE DRAWING

These and other objects of the present invention will be readily understood with reference to the following specification and attached drawing, wherein.

DETAILED DESCRIPTION OF THE INVENTION

The present invention relates to a emulation system and method for emulating legacy instructions of an outdated ("legacy") microprocessor with a new upgrade microprocessor with an incompatible instruction set and for handling calls to the legacy environment of the legacy microprocessor. In such applications, software programs are written which emulate each of the legacy instructions using instructions of the upgrade microprocessor. In known emulation systems, the emulation software causes the legacy instruction to be fetched and interpreted by the new microprocessor by way of the lookup table. As discussed in more detail below, such methodology has a significant impact on the throughput of the system. In order to increase the throughput of the system, the legacy instructions are translated into direct vectors to software routines or emulation code for emulating the legacy instructions. As such, as will be discussed in more detail below, the probability of cache misses is greatly reduced which results in increased throughput of the system.

Figure 5:
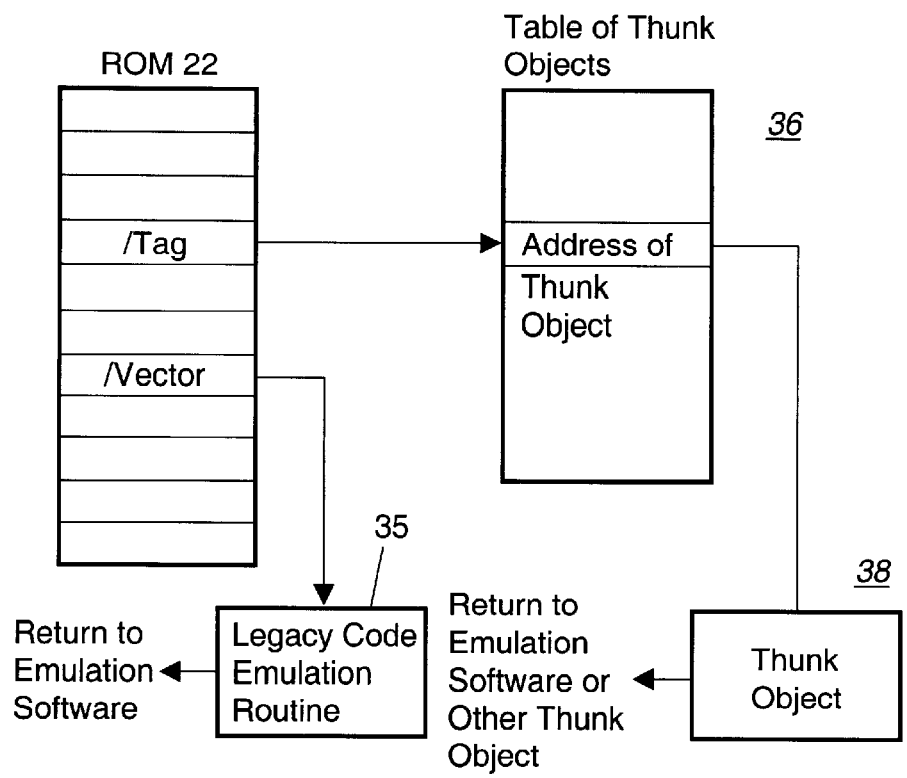
FIG. 5 is a block diagram illustrating both the indexing to a table of thunk objects and direct vectoring to legacy code emulation routines in accordance with the present invention.
Figure 6:
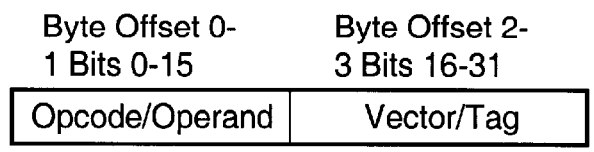
FIG. 6 is a block diagram of the translated legacy words in accordance with the present invention.

Two embodiments of the invention are described and illustrated. In particular, FIGS. 1–4 illustrate one embodiment in which each instruction of the legacy code is translated to a direct vector to a software routine for emulating the legacy instruction. FIGS. 5 and 6 illustrate an alternate embodiment in which each word of legacy code is translated to opcode/operand field and a dual function vector/tag field. The vectors are addresses to legacy emulation routines for emulating the legacy instructions. The tags are indexed to a table of thunk objects for performing various functions, such as disabling a portion of the legacy code, augmenting the legacy code with native code as well as various other purposes.

DIRECT VECTORED LEGACY INSTRUCTION SET EMULATION

Figure 1:
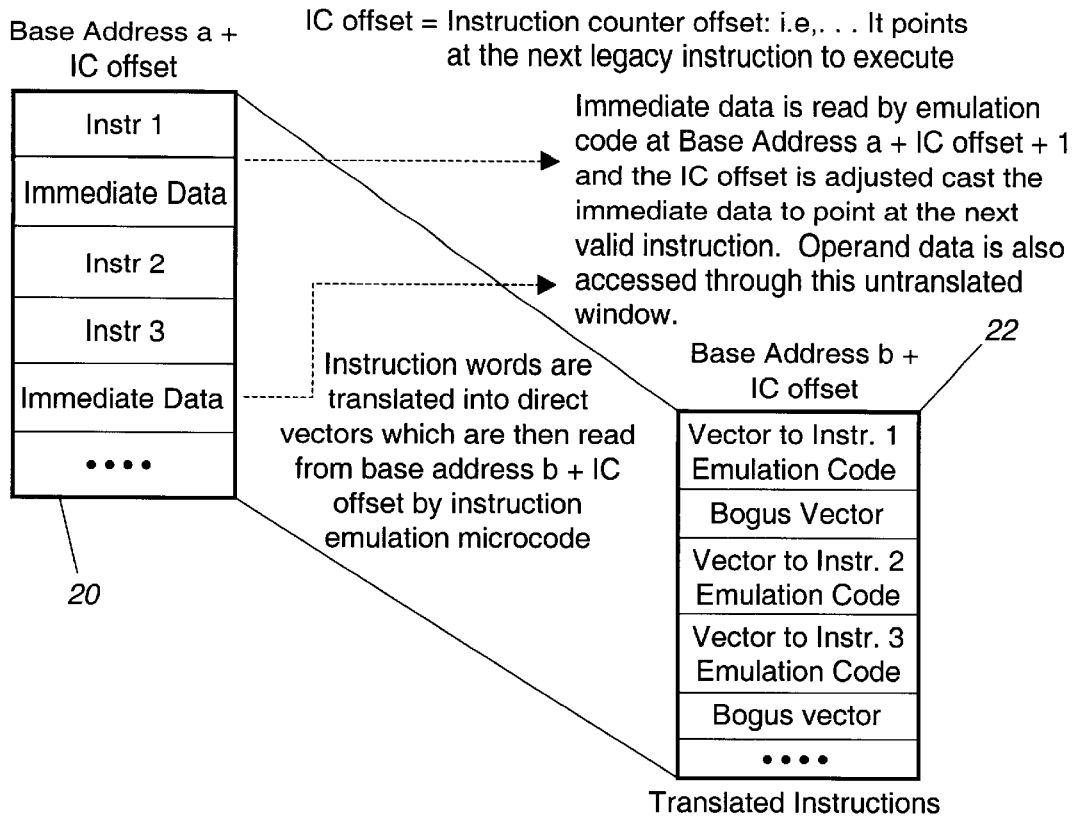
FIG. 1 is a block diagram illustrating the translation of the legacy instruction in accordance with the present invention.

Turning to FIG. 1, embedded software or code for a legacy microprocessor is generally identified with the reference numeral 20. Such code is normally stored in non-volatile read only memory (ROM). As shown, the ROM 20 includes legacy instructions, identified as INSTR 1, INSTR 2 and INSTR 3, etc. The ROM 20 also includes immediate data. The instructions INSTR 1, INSTR 2, INSTR 3, etc. plus the immediate data in the ROM 20, are located, for example, at a base address A within the memory space.

In accordance with an important aspect of the invention, each instruction (i.e. instruction INSTR 1, INSTR 2, INSTR 3, etc.) is translated to a direct vector to a software routine or emulation code for emulating the legacy instruction. For example, each legacy instruction is mapped or translated to another memory device 22, such as a ROM 22. The structure of the memory device 22 with respect to the instructions, is maintained the same as the ROM 20 but at a different base address B. In other words, instructions in the ROM 20 are located at a base address. A plus an instruction counter (IC) offset which corresponds to the next legacy instruction to be executed. The instructions, INSTR 1, INSTR 2, INSTR 3, etc. are mapped to the ROM 22 at a different base address B but with the same IC offset.

The direct vectors in the ROM 22 can either be JUMP instructions to software routines for emulating the legacy instruction or address pointers. For example, the direct vectors can represent an offset pointer to an emulation microcode routine or a pointer to a table which contains a pointer to a microcode routine. Regardless, it is these vectors that are fetched by the emulation software rather than the legacy instructions.

The immediate data may be translated into bogus vectors in the ROM 22 which are not used by the emulation software. Rather, the emulation software in accordance with present invention may access the immediate data directly from the legacy code 20 by reading the data directly at the base address A from the ROM 20.

CONCURRENT LEGACY AND NATIVE CODE EXECUTION TECHNIQUES

Alternatively, each word of legacy software can be translated into a opcode/operand field, for example, a 16 bit field, and an instruction vector/tag field, for example, a 16 bit field, as shown in FIG. 6. In an exemplary 32 bit embodiment, the vector field contains the lower 16 bits of the address of the legacy code emulation routine 35 (FIG. 5). The opcode field contains the untranslated opcode from the legacy software. The opcode may be located at offset 0–1 bytes while the vector is offset 2–3 bytes.

The instruction vector/tag field provides a dual function depending on how it is interpreted. The vector/tag field is interpreted as a vector for instructions and a tag for operands. As mentioned above, the vector is the address in the memory where the legacy code emulation routine resides. The tags are used to index to a table of thunk objects, for example as illustrated in FIG. 5. These thunk objects can be used to implement various services, such as optimizing the native code; disabling part of the legacy software; augmenting the legacy software with native software; and debugging and gathering execution statistics regarding the legacy software without modifying the legacy software. The range of values may be used to indicate whether the field is a tag or vector. For example, values of 1 to MAX_TAG-1 may be defined as valid tags. The values of MAX_TAG to 0xffff may be used to define vectors. A value 0 (no tag) may be used to indicate that no special operation is to be performed.

Referring to FIG. 5 the tags are indexed to a table of thunk objects 36. This table 36 represents a list of addresses of thunk object, such as the objects 38. These thunk objects 38 can be used for various purposes as discussed above. The various thunk objects 38 may return to the emulation software or to other thunk objects.

Figure 7:
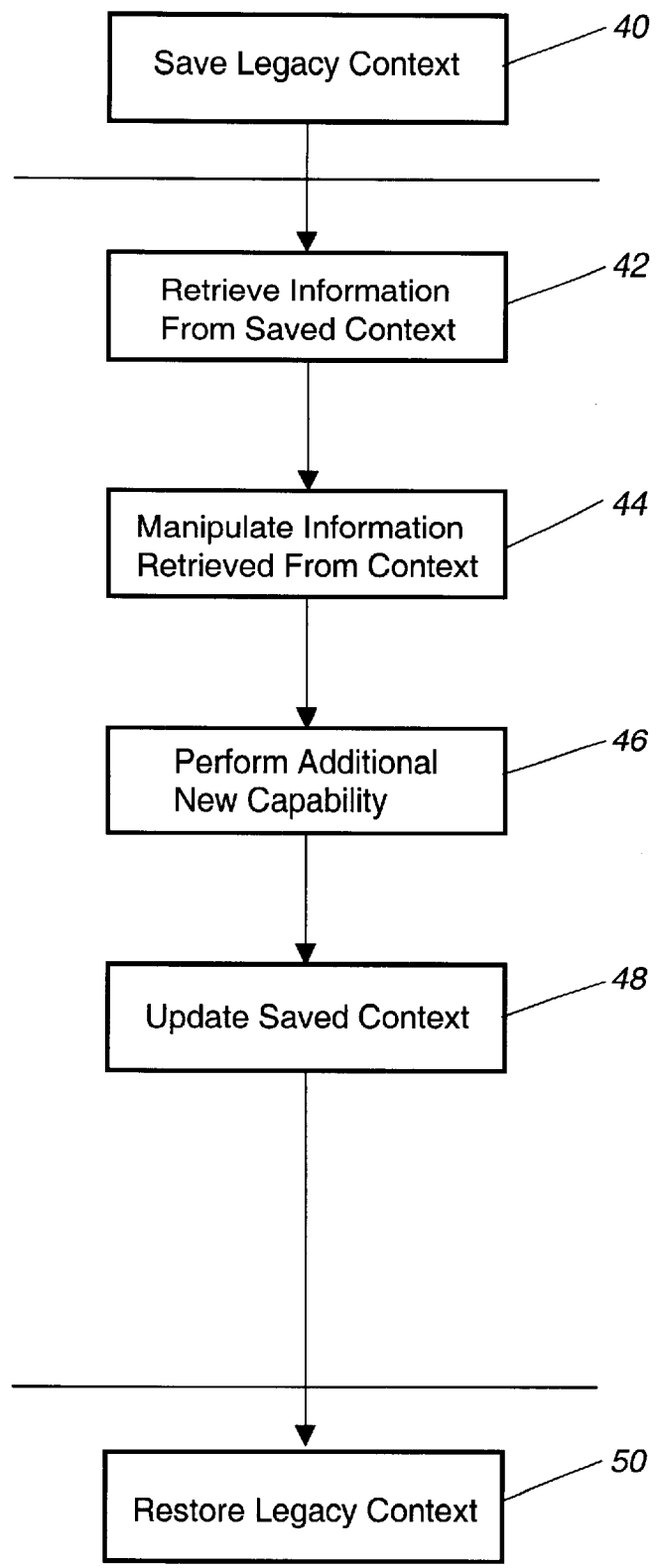
FIG. 7 is an exemplary flow chart for a generalized thunk object in accordance with the present invention.
Figure 8:
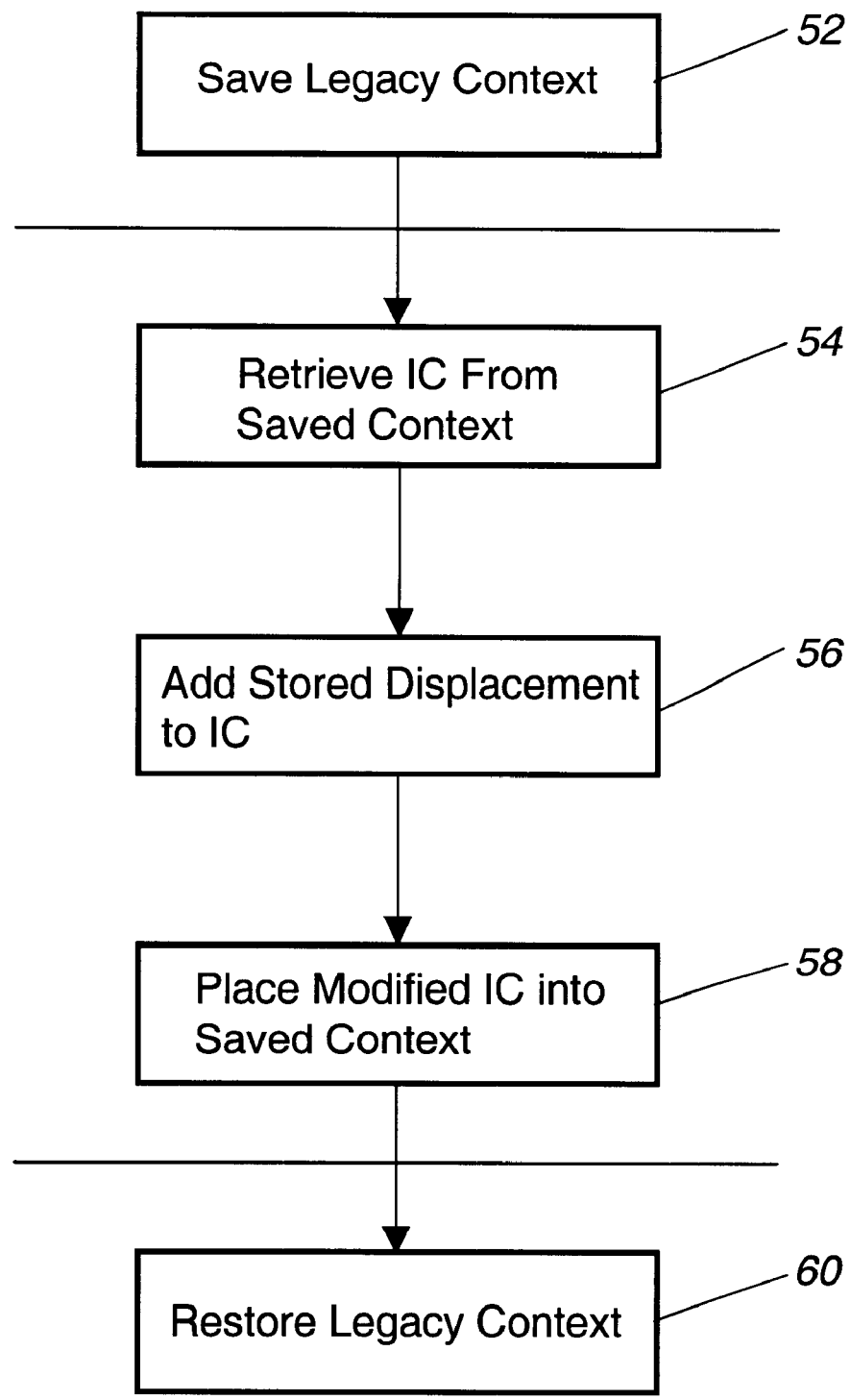
FIG. 8 is an exemplary flow chart illustrating manipulation of the instruction counter for thunk objects which disable or branch around legacy code and enable execution of native software for use with the present invention.

Flow charts for exemplary thunk objects are illustrated in FIGS. 7 and 8. FIG. 7 represents a flow chart for a generalized thunk object while FIG. 8 is an exemplary flow chart for a specific thunk object which illustrates manipulation of the instruction counter in order to branch around or disable legacy software and optimally execute native instructions in accordance with the present invention. As discussed above, the principles of the present invention are adapted to be used with virtually any number of thunk objects.

Referring to FIG. 7, the thunk objects are implemented in general by saving and storing the legacy context, for example, as illustrated by the block 40. The legacy context consists of the contents of the general purpose registers of the microprocessor including the instruction counter and other general purpose registers. As such, contents of these general purpose registers are directly accessible by the thunk objects. As indicated in step 42, the saved legacy context (i.e. contents of the general purpose registers including the instruction counter) is retrieved. Subsequently, in steps 44 and 46, the legacy context is manipulated to perform a new function as illustrated in step 46. Exemplary thunk objects include: optimizing the native code; disabling part of the legacy software; augmenting the legacy software with native code; and debugging and gathering execution statistics regarding the legacy software without modifying the legacy software. Other thunk objects are also within the broad scope of the present invention. After the legacy context is manipulated and processed in steps 44 and 46, the legacy context (i.e. general purpose registers) is updated in step 48. The system returns to the legacy context in step 50.

FIG. 8 relates to a more specific thunk object which can be used for disabling or branching around legacy software. Initially in step 52, the systems saves the legacy context. In particular, the context of the general purpose registers including the instruction counter register is saved in this step, as discussed above. In step 54, the system retrieves the pointer to the next instruction from the instruction counter register. In order to branch around or disable legacy software, a displacement is added to the pointer from the instruction counter in step 56. This displacement may be used to either branch around legacy software or to disable legacy software. The displacement added to the pointer for the instruction counter enables the system to accomplish either of those functions. After the displacement is added to the pointer in the instruction counter, a modified instruction counter value is saved and stored in step 58. Subsequently, the system returns to the legacy context in step 60 to the new value in the instruction counter register.

IMPLEMENTATION

Figure 2:
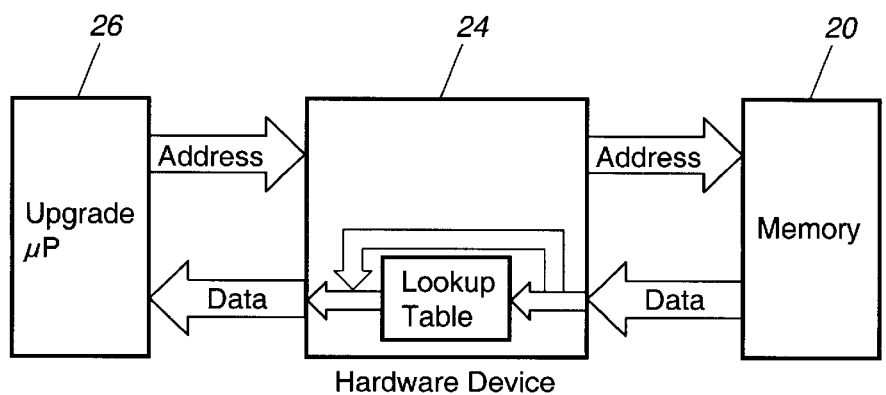
FIG. 2 is a block diagram illustrating one embodiment (in which vector translation is done by hardware) for translating the legacy instructions in accordance with the present invention.
Figure 3:
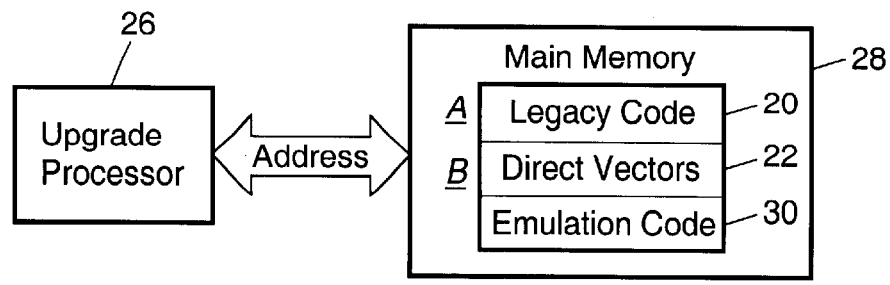
FIG. 3 is a block diagram illustrating the mapping of the legacy instructions to main memory.

Various methods are suitable for translating the legacy microcode. Although the implementation is discussed only in terms of the embodiment illustrated in FIG. 1, the following is also applicable to the embodiment illustrated in FIGS. 5 and 6. Both hardware and software methods for translating the legacy wards are suitable. FIG. 2 illustrates a hardware implementation in which a hardware device 24, such as a ROM containing a lookup table, is coupled to the data bus between an upgrade microprocessor 26 and the legacy microcode, i.e. ROM 20. The hardware device 24 is configured such that at any time an access to the legacy code is requested, i.e. base address B plus IC offset, the vector corresponding to the requested instruction is provided. Alternately, the decoder can be bypassed such that an access to the legacy code (i.e. base address A plus IC offset) will return the untranslated data. Thus, the upgrade processor can be directed to the associated emulation code routine by the fetched vector, or it can access immediate data directly from memory.

In an alternate embodiment of the invention, the legacy emulation code may be translated by software when the legacy memory is loaded into main memory or modified. In particular, a software program, for example, a portion of the initialization software, is used to load the legacy code, into the computer system main memory 28 (FIG. 3) (e.g. at base address A). In this implementation, after loading the legacy microcode, the direct vectors (i.e. ROM 22) are loaded into the main memory 28 at another location (e.g. base address B), allowing the emulation code in the upgrade processor to access either the translated 22 or untranslated 20 legacy memory sections. The vectors retrieved from the translated memory 22 are used to point to the individual software routines in the emulation code 30. With this embodiment of the invention, the translated 22 and untranslated 20 legacy memory sections need not be disjoint, they might be interleaved, such that each vector immediately follows or proceeds the untranslated instruction.

As mentioned above, the configuration of the method and system for emulating legacy instructions is adapted to improve the throughput of the system. More particularly, many known microprocessors include cache memories in order to improve the throughput of the system. Software fetched from the main memory, is copied into the cache memory, which is much quicker than main memory. Thus, instructions stored in the cache memory can be executed much quicker than those stored only in main memory. Such cache memories are normally formed from high speed static random access memory (SRAM) and are used to store copies of data in the main memory or newly stored data. Such cache memories operate on the principles that most programs execute instructions in sequence, and, due to loops, programs are likely to re-use recently fetched instructions. This principle is call locality . Thus, instead of fetching a single instruction at a time, a cache memory system looks ahead and fetches blocks of instructions in sequence and stores the instructions for quick access.

In operation, all data stored in a cache memory is stored with what is known as an address tag. The address tag indicates the physical addresses of the data in the main memory that is being stored in the cache. Whenever the microprocessor initiates a memory access, the address tags in the cache memory are first examined to determine if the particular data requested is already stored in the cache memory. When the data is found in the cache memory, this is known as a cache hit and data is immediately available to the microprocessor. If it is determined that the requested data is not in the cache memory, this condition is known as a cache miss. As a result of a cache miss, the requested data then must be retrieved from the main memory at a much slower rate.

Figure 4:
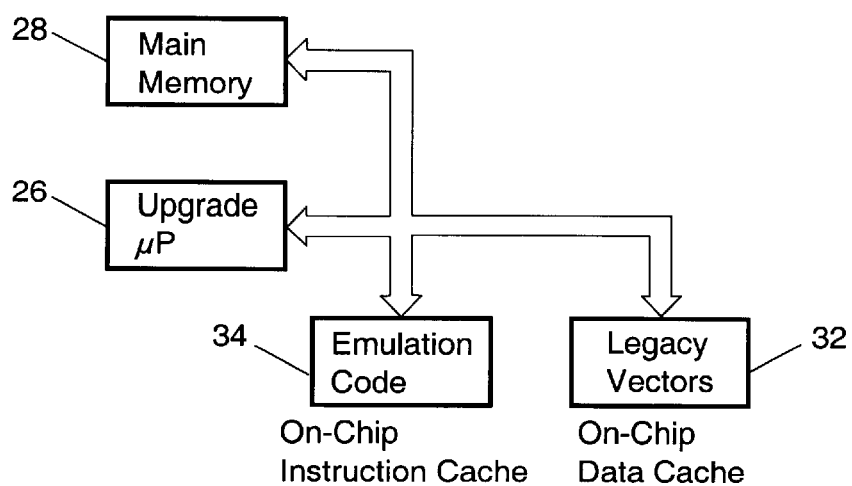
FIG. 4 is a block diagram of an upgrade microprocessor with cache memory for illustrating the operation of the cache system in accordance with the present invention.

FIG. 4 illustrates a typical configuration of a microprocessor with onboard cache memory. In previous known systems, the known emulation software fetched the legacy instructions themselves. The legacy instructions were then interpreted by way of lookup table. Since the cache memory is based on the premise that a sequence of data will be requested in sequential memory locations, the use of the lookup table is not particularly efficient in cache memory systems and results in a relatively high probability of cache misses. By utilizing direct vectors, and because of effects of the locality principle in the legacy code and corresponding direct vectors, the probability of cache misses is greatly reduced thereby increasing the overall throughput of the system. More particularly, referring to FIG. 4, a memory system in accordance with the present invention is illustrated. As shown, the system includes the upgrade microprocessor 26 which includes two onboard cache memories 32 and 34. One cache memory 32 is used for data, forming a data cache while the other cache memory 34 is used for instructions forming an instruction cache. The instruction cache 34 may be used almost exclusively for the emulation microcode. The data cache 32 may be used for the legacy code.

In operation, a group of eight vectors may be fetched from main memory upon a cache miss and stored in the data cache 32 as part of the cache line refill operation. Since legacy instructions normally proceed in sequential order, the subsequent 7 requests for instruction vectors will normally be resident in the data cache 30. If the next legacy instructions to be executed is non-sequential but is within the last one thousand instructions to executed, (i.e. local loops), there is a high probability that the vector will still be in the data cache 30. This invention has reduced the probability of cache misses and thus increased the throughput of the system.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An apparatus for emulating legacy instructions of a predetermined microprocessor defining a legacy environment, the apparatus comprising:

means for emulating said legacy instructions, said emulating means including a software routine for emulating various legacy instructions, the address of each software routine being identified by a vector:

means for translating said legacy instructions to a opcode/operand field and a vector/tag field, said vectors representing addresses of software routines for emulating said legacy instructions and said tags indexed to a table of thunk objects; for said software routines for emulating said legacy instructions;

means for fetching said vector/tag field in response to request for said legacy instructions; and means for executing said software routines or said thunk objects in response to said fetching means.

2. The apparatus as recited in claim 1, wherein said translating means is hardware based.

3. The apparatus as recited in claim 2, wherein said translating means includes a hardware device coupled between an upgrade microprocessor and said predetermined memory device for said legacy instructions.

4. The apparatus as recited in claim 1, wherein said translating means is software based.

5. A method for emulating legacy instructions with another microprocessor having an incompatible instruction set, the method comprising the steps of:

a) storing emulation software routines for emulating legacy instructions;

b) translating said legacy instructions to a vector/tag field, said vectors representing addresses of software routines for emulating said legacy instructions and said tags indexed to a table of thunk objects;

c) fetching said vector/tag field in response to requests for said legacy instructions; and d) executing said software routines or said thunk objects as a function of said vector/tag field.

6. An apparatus as recited in claim 1 further including means for bypassing or disabling a portion of the said legacy instructions.

7. The apparatus as recited in claim 6, further including means for executing native code.

8. The method as recited in claim 5 further including the step of branching around a portion of said legacy instructions.

9. As recited in claim 8, wherein said branching results in disabling a portion of said legacy software.

10. the method as recited in claim 8, further including the steps of running native software along with said legacy software.

\* \* \* \* \*